(12) United States Patent
Yao et al.

(10) Patent No.: US 7,796,385 B2
(45) Date of Patent: Sep. 14, 2010

(54) COMPUTER ENCLOSURE WITH HEAT DISSIPATING ASSEMBLY

(75) Inventors: Zhi-Jiang Yao, Shenzhen (CN); Ning-Yu Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 34 days.

(21) Appl. No.: 12/341,366

(22) Filed: Dec. 22, 2008

(65) Prior Publication Data
US 2010/0002375 A1    Jan. 7, 2010

(30) Foreign Application Priority Data
Jul. 4, 2008    (CN) .......................... 2008 2 0301438

(51) Int. Cl.
*H05K 7/20* (2006.01)
(52) U.S. Cl. ............. 361/695; 361/679.48; 361/679.49; 361/697
(58) Field of Classification Search ............ 361/679.46, 361/679.48, 679.49, 688, 689, 690–697, 361/715–722; 174/15.1, 16.1, 16.3, 252; 165/80.2, 80.3, 80.4, 104.33, 121–126, 185; 454/184; 257/706–727, E23.099; 415/177, 415/178, 213.1, 214.1, 231
See application file for complete search history.

(56) References Cited

U.S. PATENT DOCUMENTS

| 5,917,698 | A  | * | 6/1999  | Viallet ........................ 361/695   |
| 6,094,346 | A  | * | 7/2000  | Schweers et al. ............ 361/695       |
| 6,343,011 | B1 | * | 1/2002  | Yu .............................. 361/695  |
| 6,464,578 | B1 | * | 10/2002 | Chin et al. ................... 454/184    |
| 6,587,335 | B1 | * | 7/2003  | Nelson et al. .......... 361/679.49        |
| 6,643,131 | B1 | * | 11/2003 | Huang ........................ 361/697     |
| 6,657,863 | B2 | * | 12/2003 | Lee et al. .................... 361/697    |
| 6,817,939 | B2 | * | 11/2004 | Gan et al. .................... 454/184    |
| 6,930,882 | B2 | * | 8/2005  | Broder et al. ............... 361/695      |
| 7,256,993 | B2 | * | 8/2007  | Cravens et al. .............. 361/690      |
| 7,492,590 | B2 | * | 2/2009  | Chen et al. ................... 361/695    |
| 2007/0058341 | A1 | * | 3/2007 | Hsiao ......................... 361/695   |

* cited by examiner

*Primary Examiner*—Michael V Datskovskiy
(74) *Attorney, Agent, or Firm*—Clifford O. Chi

(57) ABSTRACT

A computer enclosure includes a chassis, a heat dissipation fan, a first duct, and a second duct. The chassis includes a bottom panel with a heat generating component and a side panel a vent defined therein. The first duct is attached between a first side of the fan and the vent of the chassis. The second duct is attached to a second side of the fan and covers the heat generating component. The second duct includes a resilient latch structure latchably secured to the second side of the fan.

16 Claims, 3 Drawing Sheets

COMPUTER ENCLOSURE WITH HEAT DISSIPATING ASSEMBLY

BACKGROUND

1. Technical Field

The present disclosure relates to computer enclosures and, more particularly, to a computer enclosure with a heat dissipating assembly.

2. Description of Related Art

A typical heat dissipating assembly in a typical computer enclosure usually includes a heat sink attached on a heat generating component, such as a CPU chip, and a fan attached on a panel of the typical computer enclosure to feed cooling air to the heat generating component. However, heat dissipation may be inefficient if the fan is far away from the heat generating component. Further, the fan is directly attached on the panel, causing noise.

Therefore, a computer enclosure with a heat dissipating assembly overcoming the above described shortcomings is desired.

DETAILED DESCRIPTION OF THE EMBODIMENTS

Figure 1:
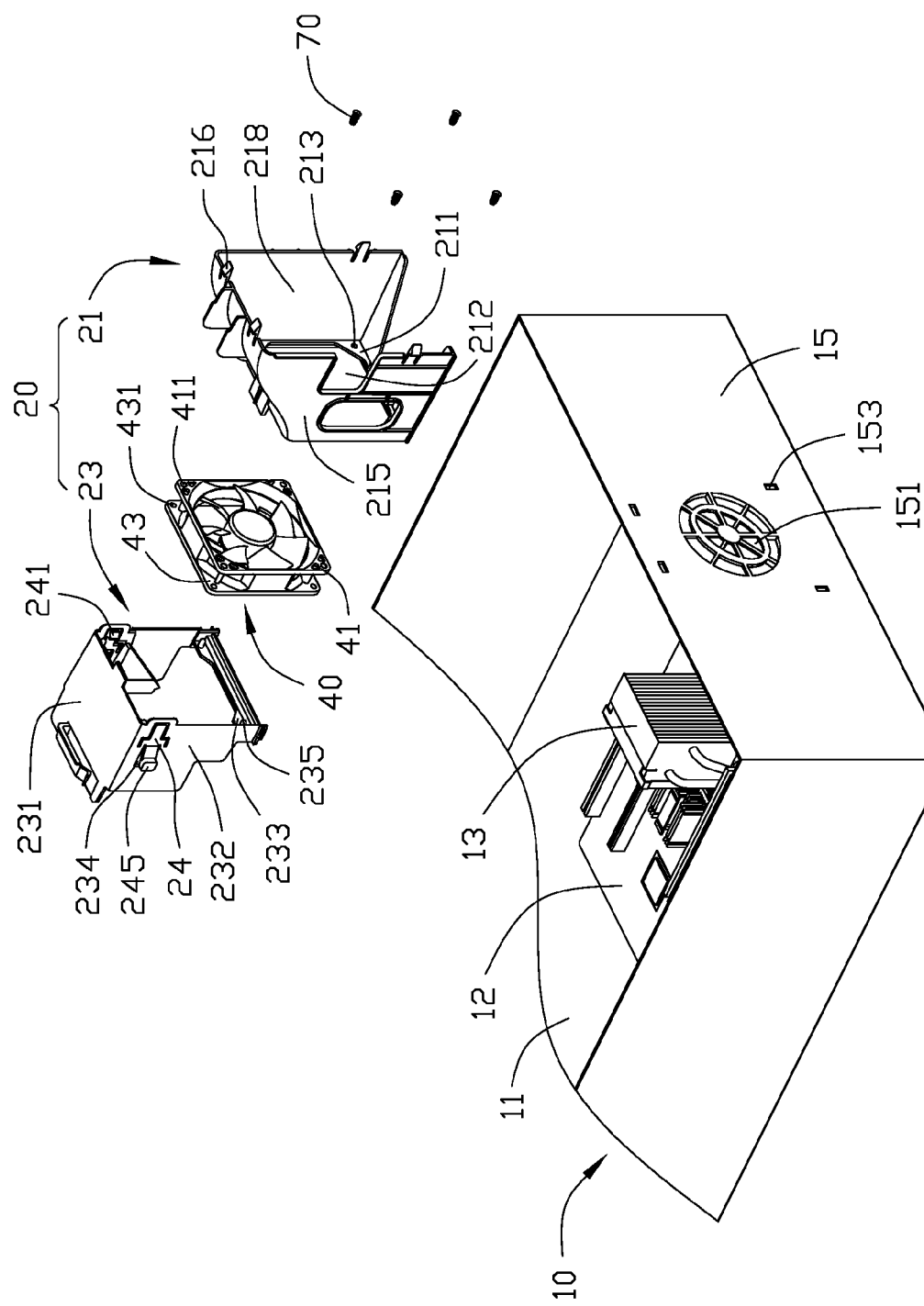
FIG. 1 is an exploded, isometric view of an embodiment of a computer enclosure with a heat dissipating assembly.
Figure 2:
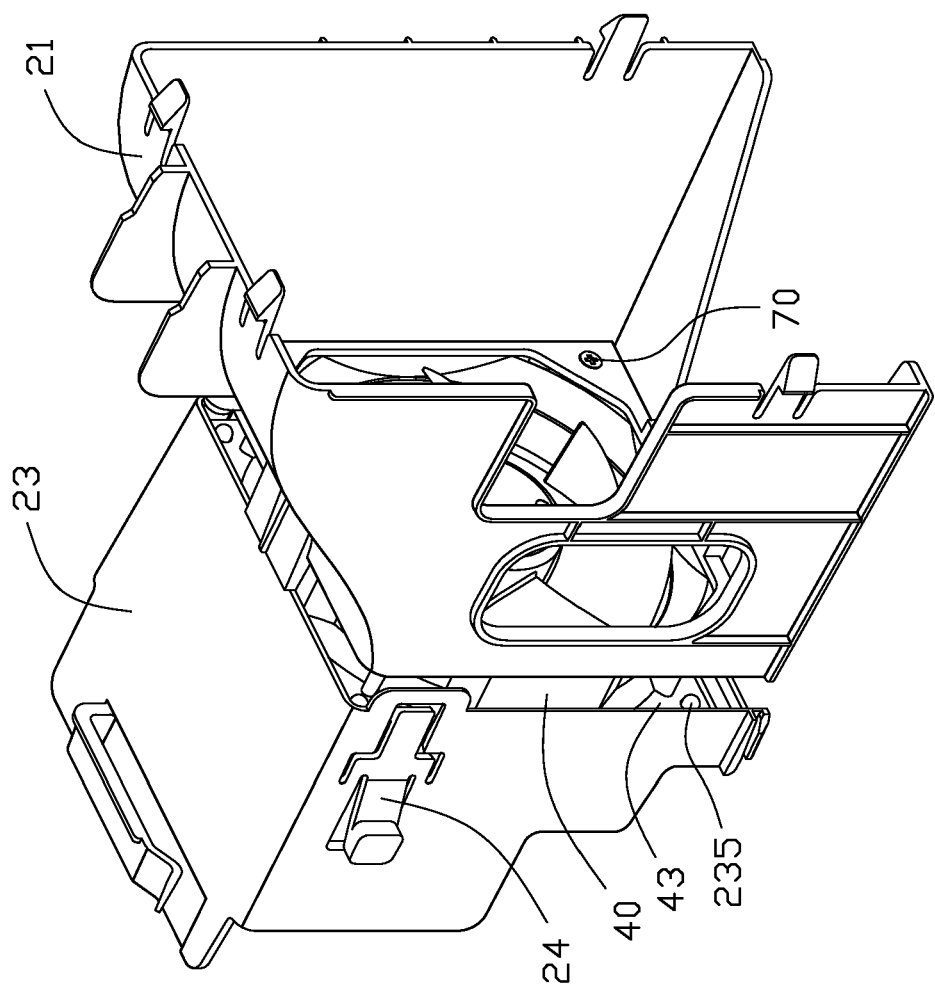
FIG. 2 is an assembled isometric view of the heat dissipating assembly of FIG. 1.

Referring to FIG. 1, an embodiment of a computer enclosure includes a chassis 10 and a heat dissipating assembly (not labeled) to dissipate heat from heat generating components in the chassis 10. The heat dissipating assembly includes an airflow guide 20 and a fan 40. The chassis 10 includes a bottom panel 11 and a side panel 15 substantially perpendicularly connected with the bottom panel 11. A heat sink 13 attached on a CPU chip (not shown) is mounted on a motherboard 12 in the chassis 10. A plurality of vents 151 and securing holes 153 are defined in the side panel 15.

The fan 40 includes a first fixing panel 41 and a second fixing panel 43 at front and back sides thereof, respectively. Each corner of the first fixing panel 41 defines a first fixing hole 411 therein. Each corner of the second fixing panel 43 defines a second fixing hole 431 therein.

The airflow guide 20 includes a first portion 21 separated from a second portion 23. The first portion 21 includes a mounting panel 211 removably fixed to the first fixing panel 41 of the fan 40. An airflow opening 212 is defined in the mounting panel 211 to facilitate airflow from and to the fan 40. Each corner of the mounting panel 211 defines a mounting hole 213 therein corresponding to the first fixing hole 411 of the first fixing panel 41 of the fan 40. A plurality of encasing panels 215 is extending from side edges of the mounting panel 211. An airflow passage 218 surrounded by the encasing panels 215 is communicated with the airflow opening 212. A plurality of securing hooks 216 extends and protrudes from the encasing panels 215 corresponding to the securing holes 153 of the side panel 15 of the chassis 10.

The second portion 23 of the airflow guide 20 includes a top panel 231, a pair of side panels 232 extending downwardly from two sides of the top panel 231, and a connecting panel 233 connected between lower ends of the side panels 232. A plurality of fixing posts 235 corresponding to the second fixing holes 431 of the second fixing panel 43 of the fan 40, protrudes from the connecting panel 233. Each of the side panels 232 defines an opening 234 therein and includes a resilient latch structure 24. A central portion of each latch structure 24 is connected to an edge of the opening 234. A front securing portion 241 of each latch structure 24 protrude from an inner side of the side panel 232. A rear pressing portion 245 of each latch structure 24 protrudes from outside of the side panel 232. Each securing portion 241 and each pressing portion 245 are movable along opposite directions while each central portion connected to the edge of the opening 234 is immovable.

Referring also to FIG. 12, the fan 40 is attached to the airflow guide 20. The fixing posts 235 of the second portion 23 of the airflow guide 20 engage in the second fixing holes 431 of the fan 40. The second fixing panel 43 of the fan 40 resists the securing portions 241 of the latch structure 24. A plurality of mounting members 70 is inserted in the mounting holes 213 of the first portion 21 and the first fixing holes 411 of the fan 40, thereby securing the first portion 21 of the airflow guide 21 to the first fixing panel 41 of the fan 40.

Figure 3:
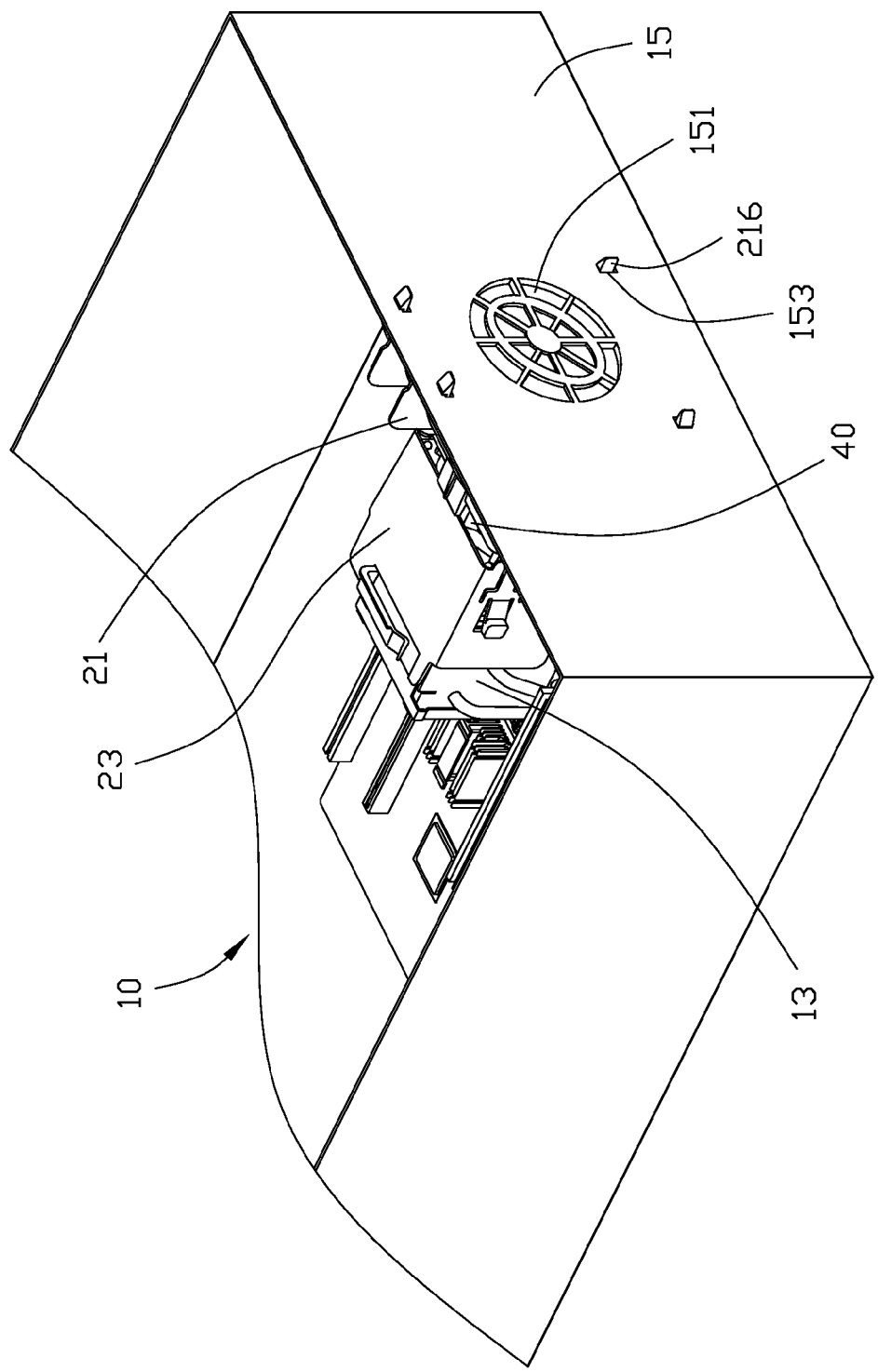
FIG. 3 is an assembled isometric view of FIG. 1.

Referring to FIG. 3, the airflow guide 20 and the fan 40 are installed in the chassis 10. The securing hooks 216 of the first portion 21 of the airflow guide 20 engage in the securing holes 153 of the side panel 15. The airflow passage 218 of the first portion 21 of the airflow guide 20 communicates with the vents 151 of the side panel 15. The heat sink 13 for CPU is encased by the second portion 23 of the airflow guide 20, thereby assisting heat dissipation of the CPU.

To disassemble the heat dissipating assembly, the securing hooks 216 of the first portion 21 of the airflow guide 10 are disengaged from the securing holes 153 of the chassis 10. The pressing portions 245 of the latch structure 24 are pressed inwardly as the securing portions 241 of the latch structure 24 move outwardly, thereby disengaging the fan 40 from the securing portions 241 of the latch structure 24 and detaching the second portion 23 from the fan 40. The mounting members 70 are disengaged from the first fixing holes 411 of the fan 40 and the mounting holes 213, thereby detaching the first portion 21 from the fan 40, making both the assembly and disassembly of the heat dissipating assembly convenient.

While the present disclosure has been illustrated by the description of embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure, comprising:
   a chassis comprising a bottom panel and a side panel with a vent defined therein;
   a heat generating component attached in the chassis;
   a heat sink attached on the heat generating component;
   a heat dissipation fan having a fixing hole defined therein; and
   an airflow guide comprising a first portion and a second portion separated from the first portion, the fan is located between the first portion and the second portion, a first side of the fan is mounted to the first portion, and a second side of the fan is mounted to the second portion.

2. The computer enclosure of claim 1, wherein a securing hole is defined in the side panel of the chassis; the first portion comprises a securing hook engaging in the securing hole.

3. The computer enclosure of claim 2, wherein the first portion further comprises a mounting panel secured to the fan and a plurality of encasing panels extending from side edges of the mounting panel; the securing hook protrudes from one of the encasing panels.

4. The computer enclosure of claim 3, wherein an opening aligned with the first side of the fan is defined in the mounting panel; an airflow passage surrounded by the encasing panels communicates with the opening and the vent of the chassis.

5. The computer enclosure of claim 1, wherein the second portion comprises a latch structure latchably engaging with the fan.

6. The computer enclosure of claim 5, wherein the latch structure comprises a pressing portion and securing portion, the pressing portion and the securing portion are movable along opposite directions; the securing portion is capable of securing the fan.

7. The computer enclosure of claim 6, wherein a central portion of the latch structure is immovable.

8. The computer enclosure of claim 7, wherein the second portion further comprises an upper panel, a pair of side panels connected to the top panel, and a lower connecting panel connected to the side panels of the second portion; the connecting panel comprises a fixing post engaging with the fixing hole of the fan.

9. A computer enclosure, comprising:
   a chassis comprising a bottom panel and a side panel with a vent defined therein;
   a heat generating component attached in the chassis;
   a heat sink attached on the heat generating component;
   a heat dissipation fan having a fixing hole defined therein;
   a first duct attached between a first side of the fan and the vent of the chassis;
   a second duct attached to a second side of the fan and covering the heat generating component, the second duct comprising a resilient latch structure securing the second side of the fan in the second duct.

10. The computer enclosure of claim 9, wherein a securing hole is defined in the side panel of the chassis, the first duct comprises a securing hook engaged in the securing hole.

11. The computer enclosure of claim 10, wherein the first duct further comprises a mounting panel secured to the fan and a plurality of encasing panels extending from side edges of the mounting panel; the securing hook protrudes from one of the encasing panels.

12. The computer enclosure of claim 11, wherein an airflow opening aligned with the first side of the fan is defined in the mounting panel; an airflow passage surrounded by the encasing panels communicates with the airflow opening and the vent of the chassis.

13. The computer enclosure of claim 9, wherein the latch structure comprises a pressing portion and a securing portion, the pressing portion and the securing portion are movable along opposite directions; the securing portion is capable of securing the fan.

14. The computer enclosure of claim 13, wherein a central portion of the latch structure is immovable.

15. The computer enclosure of claim 14, wherein the second duct further comprises an upper panel, a pair of side panels is connected to the top panel, and a lower connecting panel connected to the side panels; the connecting panel comprises a fixing post engaging with the fixing hole of the fan.

16. The computer enclosure of claim 14, wherein an opening is defined in each of the side panels of the second duct; the central portion of the latch structure is connected to an edge of the opening.

* * * * *